US007241982B2

(12) United States Patent
Chan et al.

(10) Patent No.: US 7,241,982 B2
(45) Date of Patent: Jul. 10, 2007

(54) OPTICAL IMAGE TRANSMITTING SYSTEM, OPTICAL IMAGE TRANSMITTING APPARATUS, OPTICAL IMAGE RECEIVING APPARATUS, AND OPTICAL IMAGE TRANSMITTING METHOD

(75) Inventors: Kinpui Chan, Yamagata (JP);
Masahiro Akiba, Yamagata (JP);
Yasufumi Fukuma, Tokyo (JP);
Hiroyuki Otsuka, Tokyo (JP); Hisashi Tsukada, Tokyo (JP)

(73) Assignee: Kabushiki Kaisha Topcon, Tokyo (JP)

( * ) Notice: Subject to any disclaimer, the term of this patent is extended or adjusted under 35 U.S.C. 154(b) by 153 days.

(21) Appl. No.: 11/092,709

(22) Filed: Mar. 30, 2005

(65) Prior Publication Data

US 2005/0219469 A1    Oct. 6, 2005

(30) Foreign Application Priority Data

Mar. 31, 2004 (JP) .............................. 2004-103344

(51) Int. Cl.
*H01L 27/00* (2006.01)
(52) U.S. Cl. ................................. 250/208.1; 356/237.4
(58) Field of Classification Search ............. 250/208.1, 250/227.11, 227.2, 363.04, 455, 363.05, 229, 250/216, 550; 356/497, 237.4; 378/4; 349/73, 349/74
See application file for complete search history.

(56) References Cited

U.S. PATENT DOCUMENTS 5,162,929 A * 11/1992 Roddy et al. ................. 359/17

2002/0105636 A1* 8/2002 Okawauchi ............... 356/237.4
2003/0222199 A1* 12/2003 Corson ..................... 250/208.1

FOREIGN PATENT DOCUMENTS

JP    2002-009705    1/2002

OTHER PUBLICATIONS

Akiba, M., et al."Full-field optical coherence tomography by two-dimensional heterodyne detection with a pair of CCD cameras;" *Optics Letters*, vol. 28, No. 10, pp. 816-818, May 2003./ Discussed in the specification.

* cited by examiner

*Primary Examiner*—N. Drew Richards
*Assistant Examiner*—Francis M. LeGasse, Jr.
(74) *Attorney, Agent, or Firm*—Armstrong, Kratz, Quintos, Hanson & Brooks, LLP.

(57) ABSTRACT

Provided is an optical image transmitting system capable of producing signal light including plural image information and emitting the signal light, and in addition, receiving the signal light and selectively extracting target image information. An optical image transmitting system of the present invention includes an optical image transmitting apparatus (100) for producing plural optical image information beams (S1 to Sn) representing plural optical image information and including light beams of different frequencies, superimposing the plural optical image information beams (S1 to Sn) into signal light (S) and emitting the signal light (S) through free space or an optical waveguide such as an image fiber, and an optical image receiving apparatus (200) for receiving the emitted signal light (S) and selectively detecting the optical image information beams (S1 to Sn) based on the frequency difference.

17 Claims, 9 Drawing Sheets m1(t)

m2(t)

m3(t)

m1(t)

m2(t)

m3(t)

m1(t)

m2(t)

m3(t)

OPTICAL IMAGE TRANSMITTING SYSTEM, OPTICAL IMAGE TRANSMITTING APPARATUS, OPTICAL IMAGE RECEIVING APPARATUS, AND OPTICAL IMAGE TRANSMITTING METHOD

BACKGROUND OF THE INVENTION

1. Field of the Invention

The present invention relates to an optical image transmitting system, an optical image transmitting apparatus, an optical image receiving apparatus, and an optical image transmitting method, which are used for transmitting/receiving an image (referred to as "optical image information") represented by spatial light intensity distribution. In particular, the invention relates to an optical image transmitting system, an optical image transmitting apparatus, an optical image receiving apparatus, and an optical image transmitting method, which are used for transmitting optical image information through free space or an optical waveguide like an image fiber.

2. Description of the Related Art

Nowadays, the Internet and other such information transmitting techniques are utilized everywhere in our daily life. Among those, an information transmitting technique employing an optical transmission medium such as an optical fiber or image fiber is expected to become further widespread because of its advantages such as a high transmission speed and a large transmission capacity. In particular, attentions are focused on future development of a transmission technique (also called "coherent optical transmission") based on light interference on account of its superiority in reception sensitivity etc.

The coherent optical transmission technique is based on the following optical heterodyne technique. First, signal light is emitted from the transmission side. The signal light is an optical signal including predetermined information, for example, image information. Meanwhile, reference light having a frequency (wavelength) slightly different from that of the signal light is produced on the reception side, and superimposed on the signal light by way of a beam splitter etc. to produce interference light. The interference light has a frequency corresponding to a frequency difference between the signal light and the reference light (called "beat frequency", for example). The interference light is detected by a photo detector like a photodiode, and analyzed to thereby derive the information in the signal light.

Provided that $I_r$ and $I_s$ represent an intensity of the reference light and that of the signal light, respectively, and $f_{if}$ and $\Delta\theta$ represent frequency difference and phase difference between the reference light wave and the signal light wave, respectively, a heterodyne signal as expressed by the following expression is outputted from the photo detector (for example, see Yoshizawa and Seta "Optical Heterodyne Technology (revised edition)", New Technology Communications (2003), p. 2).

Expression (1)

$$i(t) \propto I_r + I_s + 2\sqrt{I_r I_s} \cos(2\pi f_{if} t + \Delta\theta) \quad (1)$$

The third term of the right side of the expression (1) indicates an AC electrical signal and the frequency $f_{if}$ thereof is equivalent to the beat frequency caused from the interference between the reference light and the signal light. The frequency $f_{if}$ of an AC component of the heterodyne signal is the beat frequency. The first and second terms of the right side of the expression (1) indicate DC components of the heterodyne signal and correspond to a signal intensity of background light of interference light.

JP2002-009705 A (claims) discloses an example of conventional optical transmission techniques. The document discloses a high frequency signal transmission method including the steps of: combining an optical signal, a first local oscillation light, and a second local oscillation light having a frequency different from the first local oscillation light by a predetermined amount; selecting predetermined two of a plurality of frequency components obtained in the combining step; and combining the two selected frequency components, whereby a reception sensitivity to an optical signal is improved.

Considering the usability for a user, a transmitting system capable of transmitting information in a larger volume at a time will gain a large market share in the future. However, with such conventional optical transmission techniques, it is difficult to realize a transmitting system capable of transmitting an optical signal including plural types of information and, in addition, selectively extracting target information from the plural kinds of information on a reception side. In particular, a method of transmitting plural types of information as a single optical signal to extract and obtain target image information has been still out of the realm of possibility.

SUMMARY OF THE INVENTION

The present invention has been made in view of the above-mentioned circumstances. It is therefore an object of the present invention to provide an optical image transmitting system and method capable of producing signal light including plural image information and emitting the signal light and in addition, receiving the signal light and selectively extracting target image information.

It is another object of the present invention to provide an optical image transmitting apparatus capable of producing signal light including plural image information and emitting the signal light to a predetermined optical image receiving apparatus.

Further, it is still another object of the present invention to provide an optical image receiving apparatus capable of receiving signal light including plural image information emitted from a predetermined optical image transmitting apparatus and selectively extracting target image information from the signal light.

In order to achieve the above-mentioned object, a first aspect of the present invention provides an optical image transmitting system, including: optical image transmitting means for producing a plurality of optical image information beams that represent a plurality of optical image information and include light beams having different frequencies, superimposing the plurality of optical image information beams into signal light, and emitting the signal light; and optical image receiving means for receiving the emitted signal light and selectively detecting the optical image information beams based on the frequency difference.

Further, according to a second aspect of the present invention, in the optical image transmitting system according to the first aspect of the invention, the optical image transmitting means includes: image producing means for producing the plurality of optical image information beams; frequency modulating means for modulating frequencies of the plurality of produced optical image information beams by different amounts; optical image information superimposing means for superimposing the plurality of optical image information beams whose frequencies are modulated to produce the signal light; and transmitting means for transmitting the produced signal light to the optical image receiving means.

Further, according to a third aspect of the present invention, in the optical image transmitting system according to the second aspect of the invention, the image producing means includes a plurality of display means for displaying an image and light sources for emitting a light beam to the displayed image, and the optical image information is created by using the image irradiated with the light beam from the light source.

Further, according to a fourth aspect of the present invention, in the optical image transmitting system according to the third aspect of the invention, the light sources are provided to each of the plurality of display means.

Further, according to a fifth aspect of the present invention, in the optical image transmitting system according to the third aspect of the invention, the light sources fewer than the plurality of display means are provided, and the image producing means further includes light guide means for guiding the light beam from any one of the light sources to the two or more display means.

Further, according to a sixth aspect of the present invention, in the optical image transmitting system according to the fifth aspect of the invention, the light guide means is an optical fiber.

Further, according to a seventh aspect of the present invention, in the optical image transmitting system according to the fifth aspect of the invention, the light guide means is an optical system including a light division member for dividing an optical path for the light beam from the light source.

Further, according to an eighth aspect of the present invention, in the optical image transmitting system according to any one of the second to seventh aspects of the invention, the frequency modulating means is an acoustooptical modulator.

Further, according to a ninth aspect of the present invention, in the optical image transmitting system according to the first aspect of the invention, the optical image transmitting means includes: a plurality of display means for displaying an image; a plurality of light sources provided to each of the plurality of display means and adapted to emit light beams of different frequencies; optical image information superimposing means for superimposing the plurality of optical image information beams created from the image irradiated with the light beam from the light source to produce the signal light; and transmitting means for transmitting the produced signal light to the optical image receiving means.

Further, according to a tenth aspect of the present invention, in the optical image transmitting system according to any one of the third to ninth aspects of the invention, the display means is a liquid crystal display transmitting the light beam from the light source.

Further, according to an eleventh aspect of the present invention, in the optical image transmitting system according to any one of the second to ninth aspects of the invention, the optical image information superimposing means is a beam splitter for superimposing the two optical image information beams incident from directions orthogonal to each other.

Further, according to a twelfth aspect of the present invention, in the optical image transmitting system according to the first aspect of the invention, the optical image receiving means includes: a reference light source for emitting reference light having a frequency different from all frequencies of the plurality of optical image information beams in the signal light; reference light superimposing means for superimposing the signal light emitted from the optical image transmitting means on the reference light from the reference light source to produce interference light including a plurality of interference light components with a beat frequency corresponding to a frequency difference between the optical image information beams and the reference light; and a detection system for selectively detecting the interference light components from the produced interference light.

Further, according to a thirteenth aspect of the present invention, in the optical image transmitting system according to the twelfth aspect of the invention, the optical image receiving means further includes image restoring means for restoring, based on the interference light components detected by the detection system, the image represented by the optical image information beams corresponding to the interference light components.

Further, according to a fourteenth aspect of the present invention, in the optical image transmitting system according to the twelfth or thirteenth aspect of the invention, the detection system includes: intensity modulating means for periodically modulating an intensity of the produced interference light with a modulation frequency synchronous with a beat frequency of the respective interference light components; and photo detector means for receiving the interference light whose intensity is modulated, converting the interference light into an electrical signal, and outputting the signal.

Further, according to a fifteenth aspect of the present invention, in the optical image transmitting system according to the fourteenth aspect of the invention, the detection system further includes interference light dividing means for dividing the produced interference light into a plurality of optical paths, and the intensity modulating means and the photo detector means are arranged on each of the plurality of divided optical paths for the interference light.

Further, according to a sixteenth aspect of the present invention, in the optical image transmitting system according to the fourteenth or fifteenth aspect of the invention, the intensity modulating means is a shutter for periodically cutting off the interference light with the modulation frequency.

Further, according to a seventeenth aspect of the present invention, in the optical image transmitting system according to the fourteenth or fifteenth aspect of the invention, the photo detector means is a CCD camera.

Further, according to an eighteenth aspect of the present invention, in the optical image transmitting system according to the first aspect of the invention, the optical image transmitting means includes: image producing means including a plurality of display means for displaying an image and a light source for emitting a light beam to the displayed image, and producing the plurality of optical image information beams; frequency modulating means for modulating frequencies of the plurality of produced optical image information beams by different amounts; optical image superimposing means for superimposing the plurality of optical image information beams whose frequencies are modulated to produce the signal light; and transmitting means for transmitting the produced signal light to the optical image receiving means, the optical image transmitting system further includes light beam guide means for guiding a light beam emitted from the light source of the optical image transmitting means to the optical image receiving means, and the optical image receiving means includes: reference light superimposing means for superimposing the signal light from the optical image transmitting means on the light beam guided by the light beam guide means to produce interference light including a plurality of interference light components with a beat frequency corresponding to a frequency difference between the optical image information beams and the light beam; and a detection system for selectively detecting the interference light components from the produced interference light.

Further, according to a nineteenth aspect of the present invention, in the optical image transmitting system according to any one of the first to eighteenth aspects of the invention, the optical image transmitting means emits the signal light to the optical image receiving means through free space, or an optical waveguide including an image fiber capable of transmitting the optical image information.

Further, a twentieth aspect of the present invention provides an optical image transmitting apparatus, including: image producing means for producing a plurality of optical image information beams that represent a plurality of optical image information and include light beams; frequency modulating means for modulating frequencies of the plurality of produced optical image information beams by different amounts; optical image information superimposing means for superimposing the plurality of optical image information beams whose frequencies are modulated to produce signal light; and transmitting means for transmitting the produced signal light to a predetermined optical image receiving apparatus that selectively detects the optical image information beams based on the frequency difference, through free space or an optical waveguide including an optical fiber.

Further, according to a twenty-first aspect of the present invention, in the optical image transmitting apparatus according to the twentieth aspect of the invention, the image producing means includes a plurality of display means for displaying an image, and a light source for emitting a light beam to the displayed image, and the optical image information is created from the image irradiated with the light beam from the light source.

Further, according to a twenty-second aspect of the present invention, in the optical image transmitting apparatus according to the twentieth aspect of the invention, the frequency modulating means is an acoustooptical modulator.

Further, a twenty-third aspect of the present invention provides an optical image receiving apparatus, including: receiving means for receiving signal light including a plurality of optical image information beams representing a plurality of optical image information and including light beams of difference frequencies emitted from a predetermined optical image transmitting apparatus through free space or an optical waveguide including an image fiber; a reference light source for emitting reference light having a frequency different from all frequencies of the plurality of optical image information beams; reference light superimposing means for superimposing the signal light on the reference light from the reference light source to produce interference light including a plurality of interference light components with a beat frequency corresponding to a frequency difference between the optical image information beams and the reference light; and a detection system for selectively detecting the interference light components from the produced interference light.

Further, according to a twenty-fourth aspect of the present invention, the optical image receiving apparatus according to the twenty-third aspect of the invention further includes image restoring means for restoring, based on the interference light components detected by the detection system, the image represented by the optical image information beams corresponding to the interference light components.

Further, according to a twenty-fifth aspect of the present invention, in the optical image receiving apparatus according to the twenty-third or twenty-fourth aspect of the invention, the detection system includes: intensity modulating means for periodically modulating an intensity of the produced interference light with a modulation frequency synchronous with a beat frequency of the respective interference light components; and photo detector means for receiving the interference light whose intensity is modulated, converting the interference light into an electrical signal, and outputting the signal.

Further, according to a twenty-sixth aspect of the present invention, in the optical image receiving apparatus according to the twenty-fifth aspect of the invention, the detection system further includes interference light dividing means for dividing the produced interference light into a plurality of interference light beams, and the intensity modulating means and the photo detector means are arranged on an optical path for each of the plurality of divided interference light beams.

Further, according to a twenty-seventh aspect of the present invention, in the optical image receiving apparatus according to the twenty-fifth or twenty-sixth aspect of the invention, the intensity modulating means is a shutter for periodically cutting off the interference light with the modulation frequency.

Further, according to a twenty-eighth aspect of the present invention, an optical image transmitting method, includes: an optical image transmitting step of producing a plurality of optical image information beams representing a plurality of optical image information and including light beams of different frequencies, superimposing the plurality of optical image information beams to produce signal light, and emitting the produced signal light through free space or an optical waveguide including an image fiber capable of transmitting the optical image information; and an optical image receiving step of receiving the emitted signal light and selectively detecting the optical image information based on the frequency difference.

Note that in the present invention, the term "synchronous" in the phrase "modulation frequency synchronous with a beat frequency" implies that the modulation frequency is (substantially) equivalent to, n times larger than, and 1/n of the beat frequency (where n is an integer of 2 or more).

According to the present invention, the optical image transmitting means (optical image transmitting apparatus) produces signal light including plural optical image information beams of different frequencies and emitting the signal light to the optical image receiving means (optical image receiving apparatus), and the optical image receiving means receives the emitted signal light and selectively detecting each optical image information beam based on the frequency difference. Consequently, the plural image information can be transmitted as single signal light, and in addition, target image information can be selectively extracted from the signal light.

BRIEF DESCRIPTION OF THE DRAWINGS

In the accompanying drawings:

FIGS. 3A to 3D illustrate an example of a sampling mode of a first interference light component of inference light with the optical image receiving apparatus according to the present invention, in which FIG. 3A is a graph showing a time waveform of the first interference light component, FIG. 3B is a graph showing an example of a waveform of a first sampling function for sampling the first interference light component, FIG. 3C is a graph showing an example of a waveform of a second sampling function for sampling the first interference light component, and FIG. 3D is a graph showing an example of a waveform of a third sampling function for sampling the first interference light component;

FIG. 4A to FIG. 4D illustrate an example of a sampling mode of a second interference light component of inference light with the optical image receiving apparatus according to the present invention, in which FIG. 4A is a graph showing a time waveform of the second interference light component, FIG. 4B is a graph showing an example of a waveform of a first sampling function for sampling the second interference light component, FIG. 4C is a graph showing an example of a waveform of a second sampling function for sampling the second interference light component, and FIG. 4D is a graph showing an example of a waveform of a third sampling function for sampling the second interference light component;

FIG. 5A to FIG. 5D illustrate an example of a sampling mode of an n-th interference light component of inference light with the optical image receiving apparatus according to the present invention, in which FIG. 5A is a graph showing a time waveform of the n-th interference light component, FIG. 5B is a graph showing an example of a waveform of a first sampling function for sampling the n-th interference light component, FIG. 5C is a graph showing an example of a waveform of a second sampling function for sampling the n-th interference light component, and FIG. 5D is a graph showing an example of a waveform of a third sampling function for sampling the n-th interference light component;

DETAILED DESCRIPTION OF THE PREFERRED EMBODIMENT

Hereinafter, an example of an optical image transmitting system according to an embodiment of the present invention will be described in detail with reference to the accompanying drawings.

(System Structure)

Figure 1:
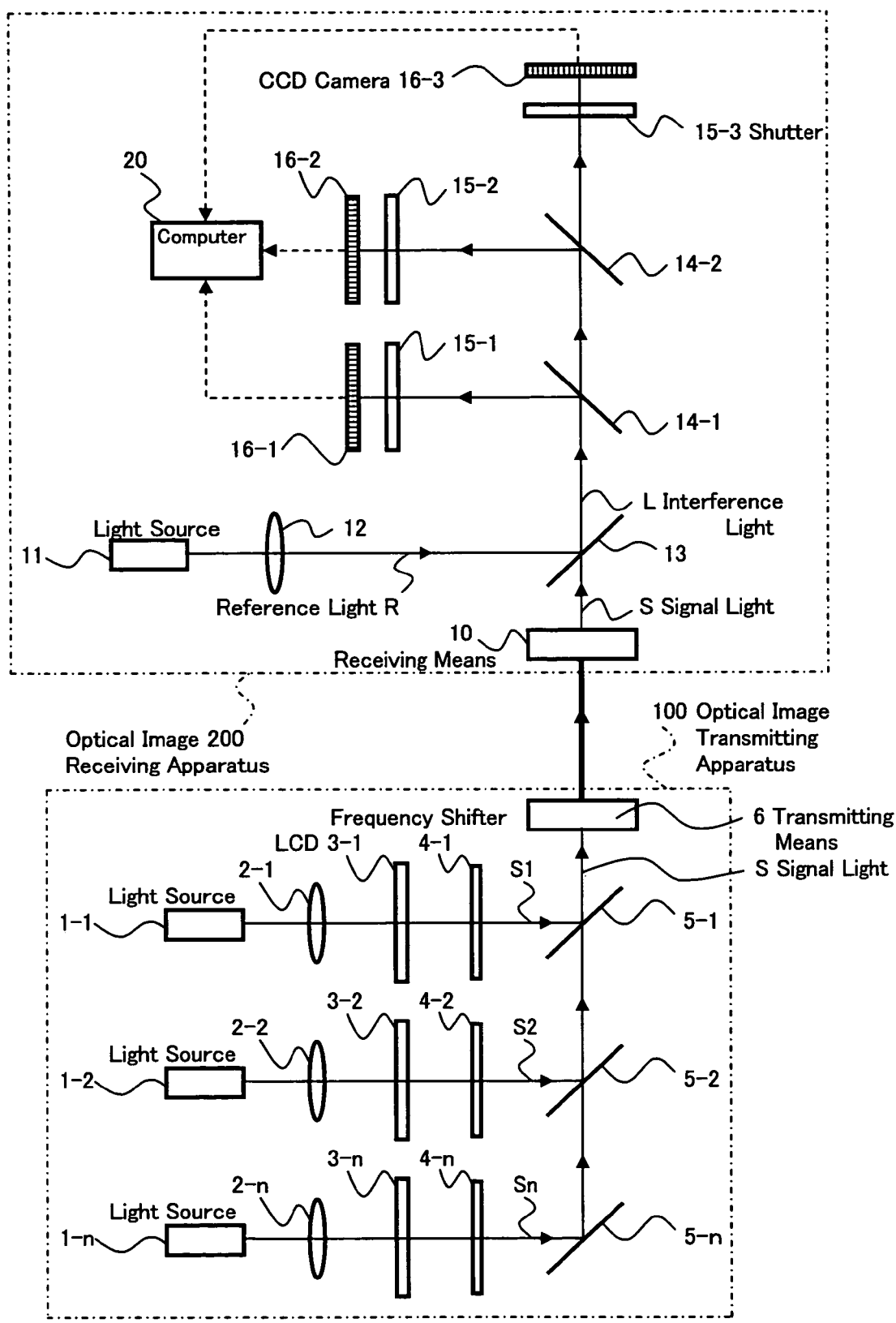
FIG. 1 is a schematic diagram showing an example of an optical image transmitting system according to the present invention.

FIG. 1 shows a schematic structure of an optical image transmitting system according to a preferred embodiment of the present invention. The optical image transmitting system includes: an optical image transmitting apparatus 100; and an optical image receiving apparatus 200. The optical image transmitting apparatus 100 is used for producing plural optical image information beams representing plural optical image information and including plural light beams having different frequencies, superimposing the plural optical image information beams into signal light, and emitting the signal light. The optical image receiving apparatus 200 receives the signal light emitted from the optical image transmitting apparatus 100 and selectively detecting the optical image information based on a difference between frequencies. The optical image transmitting apparatus 100 and the optical image receiving apparatus 200 exchange the signal light through a free space, or a space free of influences of surrounding objects on transmitted signals. Note that the optical image transmitting apparatus 100 and the optical image receiving apparatus 200 may be connected through an optical waveguide made up of an optical fiber or the like capable of transmitting the optical image information in such a way that the transmission/reception of the signal light may be performed through the optical waveguide.

Here, the optical image transmitting apparatus 100 and the optical image receiving apparatus 200 respectively constitute "optical image transmitting means" and "optical image receiving means" referred to in the present invention.

(Structure of Optical Image Transmitting Apparatus)

The optical image transmitting apparatus 100 includes: light sources 1-1 to 1-$n$; lens systems 2-1 to 2-$n$; liquid crystal displays (LCDs) 3-1 to 3-$n$; frequency shifters 4-1 to 4-$n$; beam splitters 5-1 to 5-($n$-1); a reflector 5-$n$; and transmitting means 6. The light sources 1-1 to 1-$n$ output coherent light such as a laser beam. The lens systems 2-1 to 2-$n$ convert the light beams from the light sources 1-1 to 1-$n$ into a parallel light flux, and increase beam diameters thereof. The liquid crystal displays (LCDs) 3-1 to 3-$n$ display various images according to user's requests, and allow the light beam transmitted through the lens systems 2-1 to 2-$n$ to pass therethrough to thereby produce light beams (also called optical image information beams S1 to Sn) including information on the displayed images. The frequency shifters 4-1 to 4-$n$ shift frequencies of the optical image information beams S1 to Sn. The beam splitters 5-1 to 5-($n$-1) and reflector 5-$n$ superimpose the optical image information beams S1 to Sn whose frequencies are shifted to produce signal light S. The transmitting means 6 transmits the signal light S to the optical image receiving apparatus 200 through the free space. As mentioned above, the signal light S includes the plural optical image information beams S1 to Sn (where n is an integer of 2 or more).

The light sources 1-1 to 1-$n$ are composed of any semiconductor laser, for example, and can emit continuous wave light or pulsed light as appropriate. The light beam emitted from the light sources 1-1 to 1-$n$ preferably has a coherent length not shorter than the transmission distance, that is, a distance between the optical image transmitting apparatus 100 and the optical image receiving apparatus 200. For example, any commercially-available semiconductor laser having the coherent length of several to several tens of km can be used. Here, the light sources 1-1 to 1-$n$ output the light beams of the same frequency in this structure, for instance.

The LCDs 3-1 to 3-$n$ can display different images according to user's requests. The optical image transmitting apparatus 100 is connected to a computer, for example. A user operates the computer to set images to be displayed on the respective LCDs 3-1 to 3-$n$. Here, the term "image" refers to information of every form to be displayed on the LCDs 3-1 to 3-*n*, inclusive of an image such as a picture or photograph, a pattern, and various characters.

The frequency shifters 4-1 to 4-*n* are composed of an acoustooptical modulator, for example, and shift the frequencies of the plural optical image information beams S1 to Sn by different amounts. Here, the light beams from the light sources 1-1 to 1-*n* have the same frequency, so the optical image information beams S1 to Sn have different frequencies. Note that the frequency shifters 4-1 to 4-*n* have only to shift the frequencies of the light beams from the light sources 1-1 to 1-*n* only by a slight amount.

The transmitting means 6 is composed of, for example, a lens system that collimates the produced signal light S into a parallel light flux as well as increases its beam diameter. The lens system may be, for example, a single lens (collimator lens etc.) or an optical telescope including a lens group having a set of plural lenses. Note that in the case of emitting the signal light S by way of the optical waveguide, the transmitting means 6 is composed of a transmitting interface for matching the beam diameter of the signal light S with the diameter of the optical waveguide.

Note that the optical image transmitting apparatus 100 may include means for transmitting to the optical image receiving apparatus 200 various types of setting information on the optical image transmitting apparatus 100 such as information on the frequency shift amount in which the frequency shifters 4-1 to 4-*n* shift the frequencies of the optical image information beams S1 to Sn. As the means for transmitting the setting information, for example, the optical image transmitting apparatus 100 and the optical image receiving apparatus 200 can be networked via a telephone line or optical fiber, and the setting information may be transmitted via the network. Also, the optical image transmitting apparatus 100 and the optical image receiving apparatus 200 are communicably connected through radio communication means such as a wireless LAN, for example. The setting information may be thus transmitted through the radio communication means.

Here, the light sources 1-1 to 1-*n* and the LCDs 3-1 to 3-*n* constitute "image creating means" referred to in the present invention. In particular, the LCDs 3-1 to 3-*n* constitute "display means" of the present invention. The frequency shifters 4-1 to 4-*n* constitute "frequency modulating means" of the present invention. Also, the beam splitters 5-1 to 5-(*n*-1) and the reflector 5-*n* constitute "optical image information superimposing means" of the present invention.

(Structure of Optical Image Receiving Apparatus)

The optical image receiving apparatus 200 includes: receiving means 10; a light source 11; a lens system 12; and a beam splitter 13. The receiving means 10 receives the signal light S emitted from the optical image transmitting apparatus 100 through the free space. The light source 11 outputs reference light R to be superimposed on the received signal light S. The lens system 12 collimates the reference light R into a parallel light flux, and increases its beam diameter. The beam splitter 13 superimposes the reference light R passed through the lens system 12 on the received signal light S to produce interference light L.

The optical image receiving apparatus 200 further includes: two beam splitters 14-1 and 14-2; shutters 15-1, 15-2, and 15-3 as high-speed shutters like liquid crystal shutters; and CCD cameras 16-1, 16-2, and 16-3 as storage-type two-dimensional optical sensor arrays. The beam splitters 14-1 and 14-2 divide the interference light L produced by using the beam splitter 13 into three optical paths. The shutters 15-1, 15-2, and 15-3 periodically cut off the interference light on each optical path with a predetermined frequency for sampling. The CCD cameras 16-1, 16-2, and 16-3 receive the sampled interference light, subject the light to photoelectric conversion into an electrical signal, and output the signal.

The receiving means 10 is composed of a lens system for receiving the signal light S emitted from the optical image transmitting apparatus 100 through the free space, and reducing the beam diameter down to the beam diameter of the reference light R. The lens system may be, for example, a single lens or an optical telescope including a lens group having a set of plural lenses. Thus, the interference light beams L1 to L3 whose diameter is adjusted by the receiving means 10 enter the CCD cameras 16-1 to 16-3. Note that in the case of emitting the signal light S through the optical waveguide, the receiving means 10 is composed of a receiving interface for matching the beam diameter of the signal light S, which is equal to the diameter of the optical waveguide, with the beam diameter of the reference light R.

The light source 11 is composed of a semiconductor laser emitting the laser light, and outputs the reference light R including a light beam of a frequency equivalent to none of the frequencies of the optical image information beams S1 to Sn in the signal light S. The light beam emitted from the light source 11 has the frequency very close to those of the optical image information beams S1 to Sn such that the reference light R can interfere with the optical image information beams S1 to Sn. For example, the frequency of the light beam from the light source 11 can be set equal to those of the light beams from the light sources 1-1 to 1-*n*. At this time, the frequency difference between the reference light R and the optical image information beams S1 to Sn corresponds to the shift amount in which the frequency shifters 4-1 to 4-*n* shift the frequencies. Further, the light source 11 preferably changes the frequency of the light beam to be emitted. Thus, even if the light beams emitted from the light sources 1-1 to 1-*n* are different in wavelength on the transmission side, the reference light R having the frequency equal or close to those of the optical image information beams S1 to Sn can be obtained.

The signal light S incident on the beam splitter 13 includes the plural optical image information beams S1 to Sn. Therefore, the interference light L produced through the beam splitter 13 includes plural interference light components: an interference light component L1 resulting from the interference between the reference light R and the optical image information beam S1, an interference light L2 resulting from the interference between the reference light R and the optical image information beam S2, . . . , and an interference light component Ln resulting from the interference between the reference light R and the optical image information beam Sn. At this time, the respective frequencies of the interference light components L1 to Ln balance with a shift amount in which the corresponding frequency shifter (out of the frequency shifters 4-1 to 4-*n*) shifts the frequency.

The shutters 15-1, 15-2, and 15-3 are not necessarily disposed immediately in front of the CCD cameras 16-1, 16-2, and 16-3. The shutters 15-1, 15-2, and 15-3 can be respectively disposed at given positions on respective optical paths joining branch points of the interference light beams L separated by the beam splitters 14-1, 14-2, and 14-3 with the cameras 16-1, 16-2, and 16-3 instead. That is, the shutters 15-1, 15-2, and 15-3 may be disposed in positions where the respective interference light beams L can be periodically cut off to thereby periodically adjust the quantities of light beams received by the cameras 16-1, 16-2, and 16-3 to 0.

Here, the light source 11 constitutes a "reference light source" referred to in the present invention. Besides, the beam splitter 13 constitutes "reference light superimposing means" of the present invention. The beam splitters 14-1 and 14-2 constitute "interference light dividing means" referred to in the present invention. Further, the shutters 15-1 to 15-3 and the CCD cameras 16-1 to 16-3 constitute a "detection system" of the present invention, in which the shutters 15-1 to 15-3 constitute "intensity modulating means" of the present invention, and the CCD cameras 16-1 to 16-3 constitute "photo detector means" of the present invention.

Although not shown, the optical image receiving apparatus 200 includes, as components for generating timing signals for controlling open/close timings of the shutters 15-1 to 15-3, a pulse signal generator for generating pulsed signals, and phase shifters for shifting phases of the pulsed signals to output the timing signals to the shutters 15-1 to 15-3. The phase shifters are provided on the shutters 15-1 to 15-3 in a one-to-one correspondence, and shift the phases of the timing signals relative to the shutters 15-1 to 15-3 independently of each other. Hence, the shutters 15-1 to 15-3 independently operate at different timings.

The respective shutters 15-1 to 15-3 periodically cut off the interference light beams L at predetermined frequencies (referred to as "modulation frequencies" in the present invention), respectively, in response to the timing signals from the phase shifters to sample the respective interference light beams. Therefore, the respective CCD cameras 16-1 to 16-3 periodically receive the corresponding interference light beams L. Each of the interference light beams L on each optical path is received as a periodic pulse train. At this time, the respective shutters 15-1 to 15-3 are independently opened and closed, with the result that the pulses of the interference light beams L detected by the CCD cameras 16-1 to 16-3 have predetermined phase differences. The CCD cameras 16-1 to 16-3 perform photoelectric conversion on the interference light beams L which are detected at each pixel and output heterodyne signals as results of the conversion to the computer 20. The heterodyne signal is an electrical signal reflecting the intensity and phase of the detected interference light beam.

The computer 20 executes calculation processing described later in response to the heterodyne signals outputted from the CCD cameras 16-1 to 16-3 and in addition, analyzes calculation results to restore images based on the optical image information beams S1 to Sn, that is, images displayed on the LCDs 3-1 to 3-$n$. The restored images are displayed on a monitor device (not shown) of the computer 20. The above computer 20 includes a memory or storage device such as a ROM storing an arithmetic program for the above calculation processing or a hard disk drive, and a CPU for running the arithmetic program. The computer 20 constitutes "image restoring means" referred to in the present invention. Note that as the image restoring means of the present invention, such a computer may be arranged outside a housing storing optical elements or accommodated in the same housing.

Note that in the case of applying a mode of transmitting from the optical image transmitting apparatus 100 the setting information such as information on shift amounts in which the frequency shifters 4-1 to 4-$n$ shift the frequencies as mentioned above, means for receiving the setting information is provided on the optical image receiving apparatus 200.

(Transmission Mode)

Next, referring to the accompanying drawings, description will be given of a transmission mode of the optical image transmitting system thus configured, the mode being applied to the transmission of plural optical image information.

First, a user of the optical image transmitting apparatus 100 instructs the LCDs 3-1 to 3-$n$ to display a desired image. Also, frequency shift amounts of the respective frequency shifters 4-1 to 4-$n$ are set. The shift amounts may be manually set by the user or set to predetermined default values.

The light beam emitted from the light source 1-1 passes through the lens system 2-1 to thereby increase its beam diameter, and then is transmitted through the LCD 3-1 and converted into a light beam including information on the display image (optical image information beam S1). The frequency of the optical image information beam S1 is shifted by a predetermined amount with the frequency shifter 4-1. The light beams emitted from the light sources 1-2 to 1-$n$ are similarly converted into the optical image information beams S2 to Sn, respectively. As mentioned above, the optical image information beams S1 to Sn have different frequencies. The plural optical image information beams S1 to Sn are superimposed by use of the beam splitters 5-1 to 5-($n$-1) and the reflector 5-$n$ to thereby produce the signal light S. The transmitting means 6 increases the beam diameter of the signal light S to be emitted toward the optical image receiving apparatus 200 through the free space (or optical waveguide; the same applies to the following description).

The receiving means 10 of the optical image receiving apparatus 200 receives the signal light S passed from the optical image transmitting apparatus 100 and reduces the beam diameter down to the beam diameter of the reference light R.

Note that in the case of transmitting to the optical image receiving apparatus 200, the setting information on the optical image transmitting apparatus 100 such as information on the shift amounts in which the frequency shifters 4-1 to 4-$n$ shift the frequencies, the optical image transmitting apparatus 100 transmits the setting information to the optical image receiving apparatus 200 at (substantially) the same timing as the emission timing of the signal light S. The transmitted information on the frequency shift amounts is forwarded to control means (not shown) such as a CPU of the optical image receiving apparatus 200. The control means uses the frequency shift amount information to control the pulse signal generator for setting the open/close frequencies of the shutters 15-1 to 15-$n$. If other setting information is transmitted from the optical image transmitting apparatus 100, the optical image receiving apparatus 200 may use the other setting information to control the apparatus etc. as appropriate.

Figure 2:
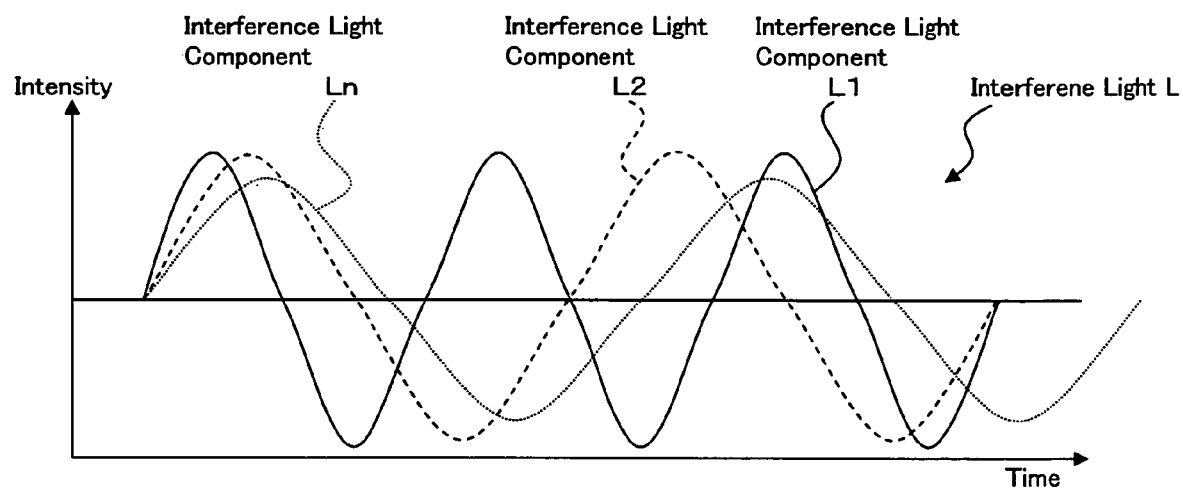
FIG. 2 is a graph showing time waveforms of interference light detected by an optical image receiving apparatus according to the present invention.
Figure 3:
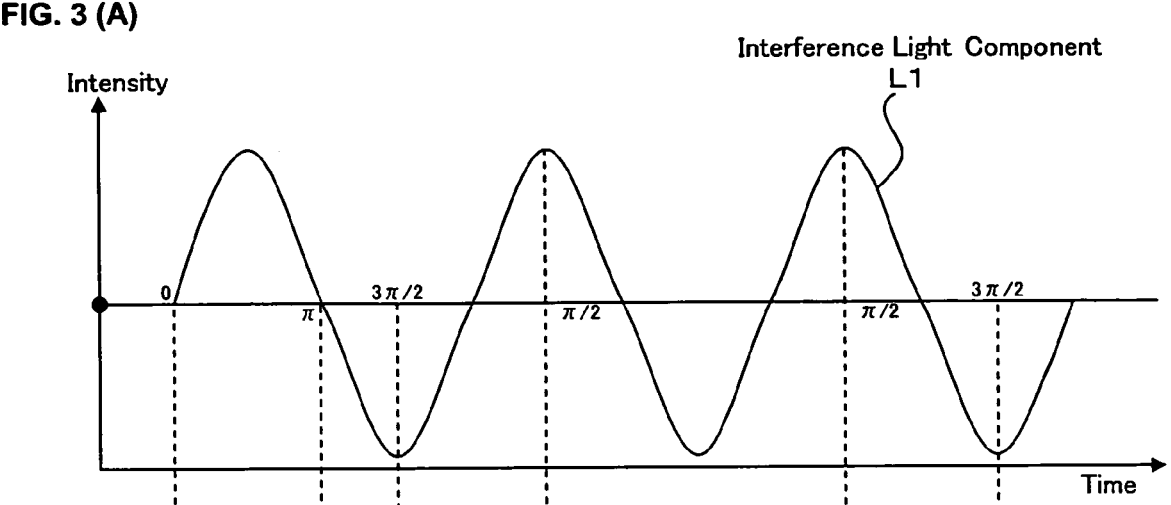
Figure 3:
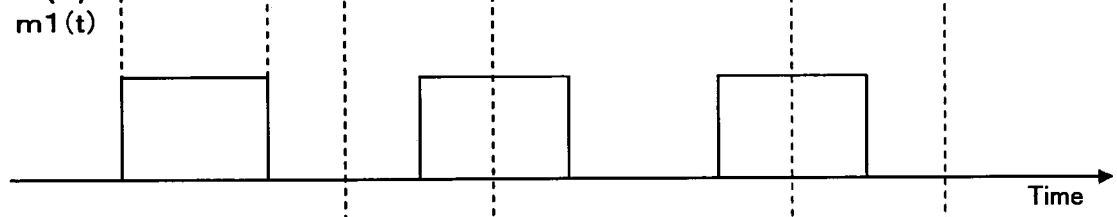
Figure 3:
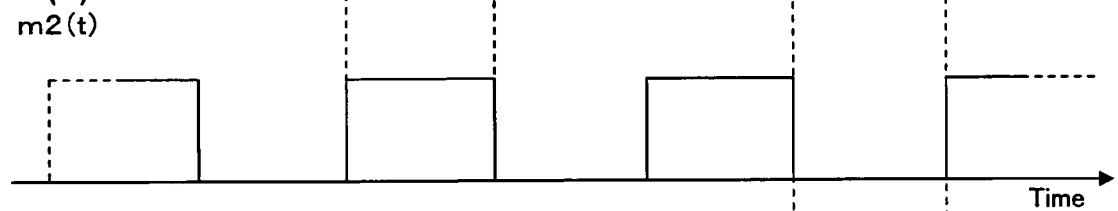
Figure 3:
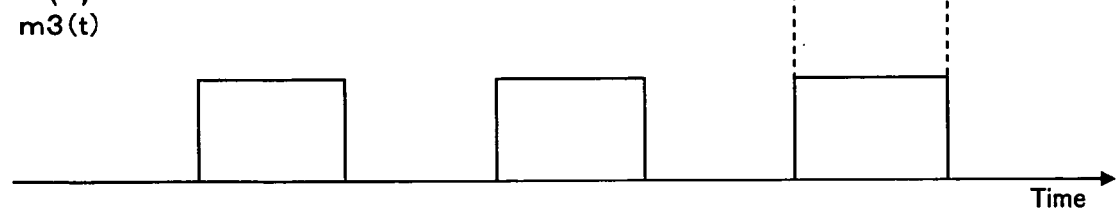
Figure 4:
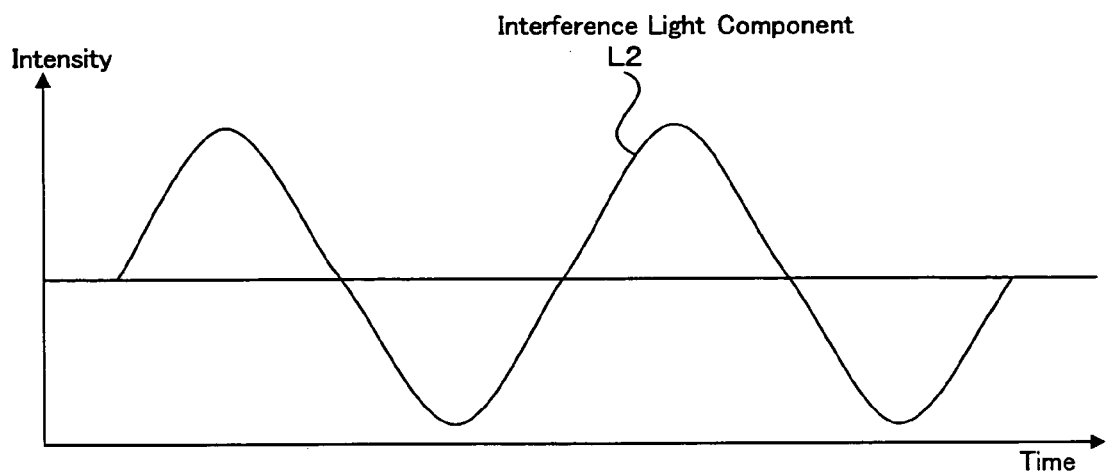
Figure 4:
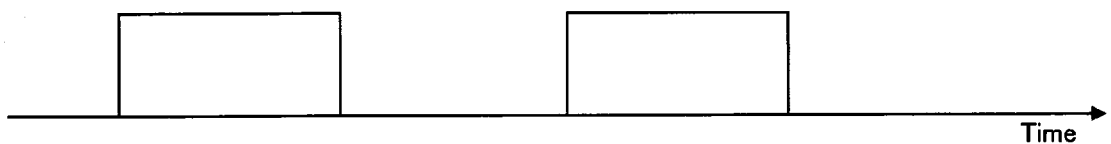
Figure 4:
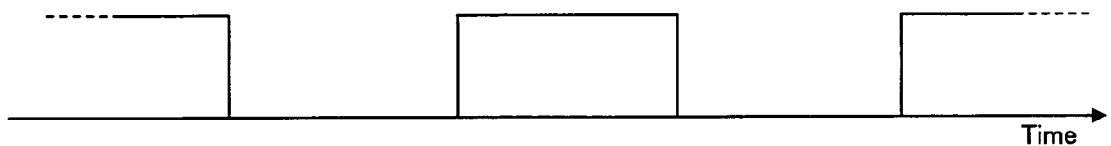
Figure 4:
Figure 5:
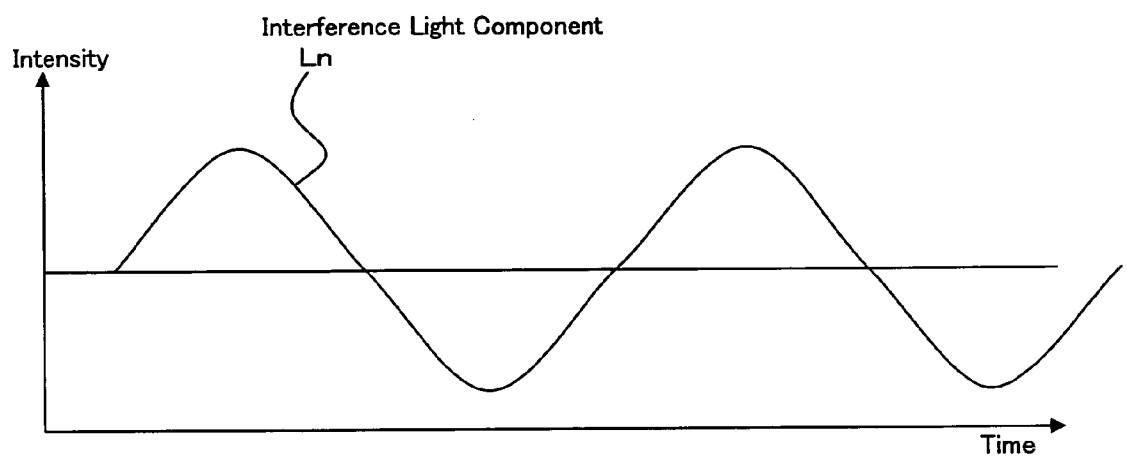
Figure 5:
Figure 5:
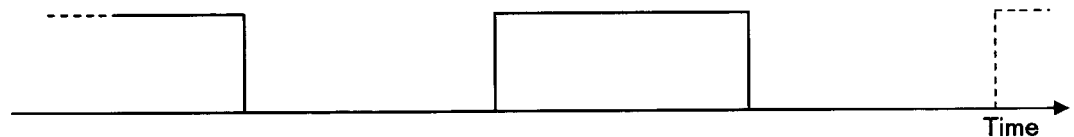
Figure 5:
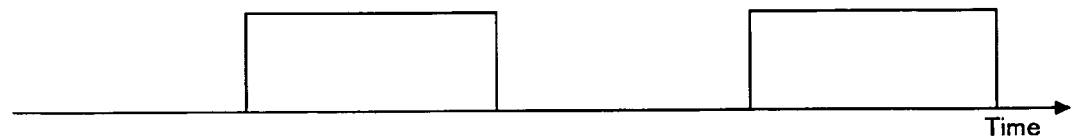

The signal light S whose diameter is adjusted by the receiving means 10 is superimposed on the reference light R from the light source 11 by use of the beam splitter 13 to thereby produce the interference light L. The interference light L includes the interference light components L1 to Ln that are produced by superimposing the optical image information beams S1 to Sn of the signal light S on the reference light R as mentioned above (see FIG. 2). The interference light components L1 to Ln are regarded as superimposed ones of the DC component including the background light of the interference light L and the AC component (beat signal) having the beat frequency.

The interference light L is divided into two through the beam splitter 14-1, and the CCD camera 16-1 detects a part thereof through the shutter 15-1.

Also, the interference light L passed through the beam splitter 14-1 is further divided into two through the next beam splitter 14-2, and the CCD camera 16-2 detects a part thereof through the shutter 15-2.

The interference light L passed through the beam splitter 14-2 is detected by the CCD camera 16-3 through the shutter 15-3.

Here, a division ratio at which the beam splitter 14-1 divides the interference light, that is, an intensity ratio between the transmitted interference light and the reflected interference light L is preferably 2:1. That is, the beam splitter 14-1 preferably has a property of transmitting ⅔ of the incident light and reflecting ⅓ thereof. Besides, the intensity ratio between the interference light L transmitted through the beam splitter 14-2 and the interference light L reflected thereby is preferably 1:1. In other words, the beam splitter 14-2 preferably has a property of transmitting ½ of the incident light and reflecting ½ thereof. Thus, the interference light beams L detected by the CCD cameras 16-1, 16-2, and 16-3 have the same intensity, which is suitable for the following calculation processing. Note that the intensity ratio for the interference light to be divided is not limited thereto but can be appropriately set.

FIG. 2, and FIG. 3A to FIG. 5D illustrate sampling modes in which the shutters 15-1 to 15-3 sample the interference light L. Here, the frequency shifters 4-1 to 4-n shift the frequencies by different shift amounts, so the interference light components L1 to Ln have different frequencies. Therefore, the shutters 15-1 to 15-3 can selectively extract the interference light components L1 to Ln from the interference light L for sampling.

FIG. 3A shows a timing waveform of the interference light component L1 composed of the optical image information beam S1 of the signal light S and the reference light R. FIG. 3B, FIG. 3C, and FIG. 3D show an example of the sampling function for controlling the open/close operation of the shutters 15-1, 15-2, and 15-3, respectively. The frequencies of the sampling functions are set equal or close to the frequency of the interference light component L1.

It is assumed that $m_1(t)$ represents a sampling function shown in FIG. 3B. The shutter 15-1 periodically opens/closes (on-off) in response to the sampling function $m_1(t)$, thereby sampling the interference light component L1. The sampling function $m_1(t)$ has a waveform of a rectangular train with a duty of 50% and a frequency $f_{sm}$ thereof is set equal or close to the frequency $f_{if}$ of the interference light component L1 as mentioned above (that is, $f_{sm}=f_{if}$ or $f_{sm}\approx f_{if}$).

With the sampling function $m_1(t)$, the interference light component L1 within a range of a phase 0 to a phase π is sampled. A difference between the frequency $f_{sm}$ of the sampling function $m_1(t)$ and the beat frequency $f_{if}$ of the interference light component L1 as expressed by the expression (1) ($\delta f=|f_{if}-f_{sm}|$) is set to a value sufficiently smaller than a response frequency of the CCD camera 16-1 serving as the storage type photo sensor. Therefore, the interference light component L1 within substantially the same phase range is sampled during each period thereof. At this time, an output $i_1(t)$ from the CCD camera 16-1 that receives the interference light component L1 is proportional to the amount of photocharge stored in the CCD camera 16-1 during a light receiving period. More specifically, the output $i_1(t)$ is expressed by the following expression (for example, see M. Akiba, K. P. Chan, and N. Tanno, "Optics Letters", Vol. 28, 816 (2003)).

Expression (2)

$$i_1(t) = \langle K_1 i(t) m_1(t) \rangle$$
$$= K_1 \left[ \frac{1}{2} I_s + \frac{1}{2} I_r + \frac{2}{\pi} \sqrt{I_s I_r} \cos(2\pi \delta f t + \phi) \right]$$

(2)

Here, <-> indicates a time average produced by a storage effect of the CCD camera 16-1. In addition, φ indicates an initial phase value for detection and $K_1$ indicates photo detection efficiency including reflectance of the beam splitter 14-1 and a photoelectric conversion rate of the CCD camera 16-1.

Similarly, the interference light component L1 is sampled by the shutter 15-2 whose open/close timings are controlled based on a predetermined sampling function $m_2(t)$ shown in FIG. 3C, and then detected by the CCD camera 16-2. The sampling function $m_2(t)$ has a waveform of a rectangular train with a duty of 50% and a frequency $f_{sm}$ thereof is equal to that of the sampling function $m_1(t)$. The sampling function $m_2(t)$ has a phase difference $\Delta\theta_{1,2}$ with the sampling function $m_1(t)$. The phase difference $\Delta\theta_{1,2}$ is attained by setting phase shift amounts in which the phase shifters shift the frequencies in advance. Under the above-mentioned condition, the following output $i_2(t)$ is obtained from the CCD camera 16-2 based on the same fundamentals as the expression (2).

Expression (3)

$$i_2 = K_2 \left[ \frac{1}{2} I_s + \frac{1}{2} I_r + \frac{2}{\pi} \sqrt{I_s I_r} \cos(2\pi \delta f t + \phi + \Delta\theta_{1,2}) \right]$$

(3)

Here, $K_2$ indicates photo detection efficiency including transmittance of the beam splitter 14-1, reflectance of the beam splitter 14-2, and a photoelectric conversion rate of the CCD camera 16-2.

As is apparent from the expressions (2) and (3), each of the outputs from the CCD cameras 16-1 and 16-2 includes the term of an intensity $I_s$ of the signal light S and the term of an intensity $I_r$ of the reference light R. In addition, the output from the CCD camera 16-1 includes the term related to an amplitude $\sqrt{(I_s I_r)}$ of the interference light component L1 and a phase $(2\pi\delta f t + \phi)$ thereof. The output from the CCD camera 16-2 includes the term related to an amplitude $\sqrt{(I_s I_r)}$ of the interference light component L1 and a phase $(2\pi\delta f t + \phi + \Delta\theta_{1,2})$ thereof.

The interference light component L1 is sampled by the shutter 15-3 whose open/close timings are controlled based on a sampling function $m_3(t)$ shown in FIG. 3D, and then detected by the CCD camera 16-3. The sampling function $m_3(t)$ has a waveform of a rectangular train with a duty of 50% and a frequency $f_{sm}$ thereof is equal to that of the sampling function $m_1(t)$. The sampling function $m_3(t)$ has a phase difference $\Delta\theta_{1,3}$ with the sampling function $m_1(t)$. The phase difference $\Delta\theta_{1,3}$ is attained by setting phase shift amounts in which the phase shifters shift the frequencies in advance. At this time, the following output $i_3(t)$ is obtained from the CCD camera 16-3 based on the same fundamentals as the expression (2).

Expression (4)

$$i_3 = K_3 \left[ \frac{1}{2} I_s + \frac{1}{2} I_r + \frac{2}{\pi} \sqrt{I_s I_r} \cos(2\pi \delta f t + \phi + \Delta\theta_{1,3}) \right] \quad (4)$$

Here, $K_3$ indicates photo detection efficiency including respective transmittances of the beam splitters 14-1 and 14-2 and a photoelectric conversion rate of the CCD camera 16-3.

The interference light components L2 and Ln shown in FIG. 4A to FIG. 5D are sampled based on the same fundamentals, and detected by the CCD cameras 16-1, 16-2, and 16-3.

(Calculation Processing)

Electrical signals outputted from the CCD cameras 16-1, 16-2, and 16-3 as expressed by the expressions (2), (3), and (4) are transmitted to the computer 20. The computer 20 executes the calculation as described below using the output results. Therefore, the DC component corresponding to the background light of the interference light L1 and expressed by the expression (1), the signal intensity of the interference light L1, and the spatial phase distribution thereof are calculated. The computer 20 creates an image represented by the optical image information beam S1 corresponding to the interference light component L1 based on the intensity and phase distribution of the interference light component L1, that is, an image displayed on the LCD 3-1.

Here, it is assumed that, as shown in FIG. 3B, FIG. 3C, and FIG. 3D, the phase difference $\Delta\theta_{1,2}$ between the sampling function $m_1(t)$ and the sampling function $m_2(t)$ is set to $-\pi/2$ and the phase difference $\Delta\theta_{1,3}$ between the sampling function $m_1(t)$ and the sampling function $m_3(t)$ is set to $\pi/2$. At this time, an intensity $S_1$ of the DC component composed of the background light of the interference light component L1 and phase quadrature components (sine component and cosine component) $S_2$ and $S_3$ thereof are expressed by the following respective expressions.

Expression (5)

$$S_1 = \frac{i_2}{K_2} + \frac{i_3}{K_3} = I_s + I_r \quad (5)$$

Therefore, the intensity of the DC component corresponding to the background light of the interference light L can be calculated based on the electrical signals from the two CCD cameras 16-2 and 16-3 of the three CCD cameras 16-2, 16-2, and 16-3.

Expression (6)

$$S_2 = \frac{i_2}{K_2} - \frac{i_3}{K_3} = \frac{4}{\pi}\sqrt{I_s I_r} \sin(2\pi\delta f t + \phi) \quad (6)$$

Expression (7)

$$S_3 = \frac{2i_1}{K_1} - S_1 = \frac{4}{\pi}\sqrt{I_s I_r} \cos(2\pi\delta f t + \phi) \quad (7)$$

When the expressions (6) and (7) are used, the amplitude of the interference light component L1 is expressed by the following expression.

Expression (8)

$$\sqrt{I_s I_r} \propto \sqrt{S_2^2 + S_3^2} \quad (8)$$

Here, a proportionality factor related to the right side is $\pi/4$. The amplitude of the interference light component L1 can be calculated using the DC component obtained by the expression (5). Therefore, when the DC component is added to the amplitude of the heterodyne signal, the intensity of the interference light component L1 can be obtained.

According to the optical image receiving apparatus 200 of the transmitting system, the spatial phase distribution of the interference light component L1 can be obtained for imaging by the following measurement method.

When the interference components $S_2(t_1)$ and $S_3(t_1)$ of the interference light component L1 which are expressed by the expressions (6) and (7) are obtained at a measurement time $t=t_1$, a signal as expressed by the following expression is derived from a ratio between the two interference components.

Expression (9)

$$S_4 = \frac{S_2(t_1)}{S_3(t_1)} = \tan(2\pi\delta f t_1 + \phi) \quad (9)$$

As is apparent from the expression (9), a signal $S_4$ does not depend on the amplitude of the interference light component L1 and includes only phase information thereof. Therefore, a phase $\phi$ (x, y, $t_1$) of the interference light component L1 which is outputted from each of pixels of the CCD cameras 16-1, 16-2, and 16-3, each of which is the two-dimensional photo sensor array, is expressed by the following expression. Here, (x, y) indicate positional coordinates of each of the pixels which are set on each of the CCDs.

Expression (10)

$$\phi(x, y, t_1) = \tan^{-1}\left[\frac{S_2(x, y, t_1)}{S_3(x, y, t_1)}\right] - 2\pi\delta f t_1 \quad (10)$$

It can be assumed that the second term $2\pi\delta f t_1$ of the expression (10) is an instantaneous phase value of an AC signal having a frequency $\delta f$ of zero or substantially zero at the measurement time $t_1$ and kept constant regardless of a position (that is, variables x, y) of a pixel of each of the CCD cameras 16-1, 16-2, and 16-3. Therefore, when a difference between a phase $\phi$ ($x_1$, $y_1$, $t_1$) of a heterodyne signal detected from a pixel located at coordinates (x=$x_1$, y=$y_1$) on each of the CCD cameras 16-1, 16-2, and 16-3 and a phase of a heterodyne signal detected from each of pixels are obtained, a spatial phase distribution of the interference light component L1 can be obtained. The reference to the phase information enables the image to be restored with high precision.

When the phase information is used, frequency information of the interference light component L1 can be obtained. That is, the frequency difference $\delta f$ between the frequency $f_{if}$ of the heterodyne signal corresponding to the interference light component L1 and the sampling frequency $f_{sm}$ is calculated by the following expression based on phases $\phi$ (x, y, $t_1$) and $\phi$ (x, y, $t_2$) obtained by calculation at two measurement times $t=t_1$ and $t=t_2$.

Expression (11)

$$\delta f = \frac{1}{2\pi}\left|\frac{\phi(x, y, t_1) - \phi(x, y, t_2)}{t_1 - t_2}\right|$$ (11)

The sampling frequency $f_{sm}$ is a known value, so the frequency $f_{if}$ of the heterodyne signal, that is, the frequency of the interference light component L1 can be derived from the calculation results of the expression (11).

The intensity and spatial phase distribution of the interference light components L2 and Ln shown in FIG. 4A to FIG. 5D can be similarly calculated based on the same fundamentals.

The optical image transmitting system of this embodiment is used in the following mode, for example. That is, the optical image transmitting apparatus 100 is placed in a building, and the optical image receiving apparatus 200 is installed in another building facing the target building across a street. Further, an optical telescope serving as the transmitting means 6 of the optical image transmitting apparatus 100 is directed to the other building. Another optical telescope serving as the receiving means 10 of the optical image receiving apparatus 200 is set in such a position as to receive the signal light S emitted from the transmitting means 6. A user of the optical image transmitting apparatus 100 instructs the LCDs 3-1 to 3-n to display plural images as a transmission target to emit the signal light S including the optical image information beams S1 to Sn. A user of the optical image receiving apparatus 200 can selectively receive desired ones of the optical image information beams S1 to Sn in the emitted signal light S.

Note that the optical image transmitting system is not exclusively applied to close-range optical image transmission, but is applicable to longer-distance transmission as long as the magnification of the optical telescope is appropriately adjusted, for example.

MODIFIED EXAMPLE

Hereinafter, various modified examples of the optical image transmitting system according to the embodiment will be described with reference to the accompanying drawings.

First Modified Example

Figure 6:
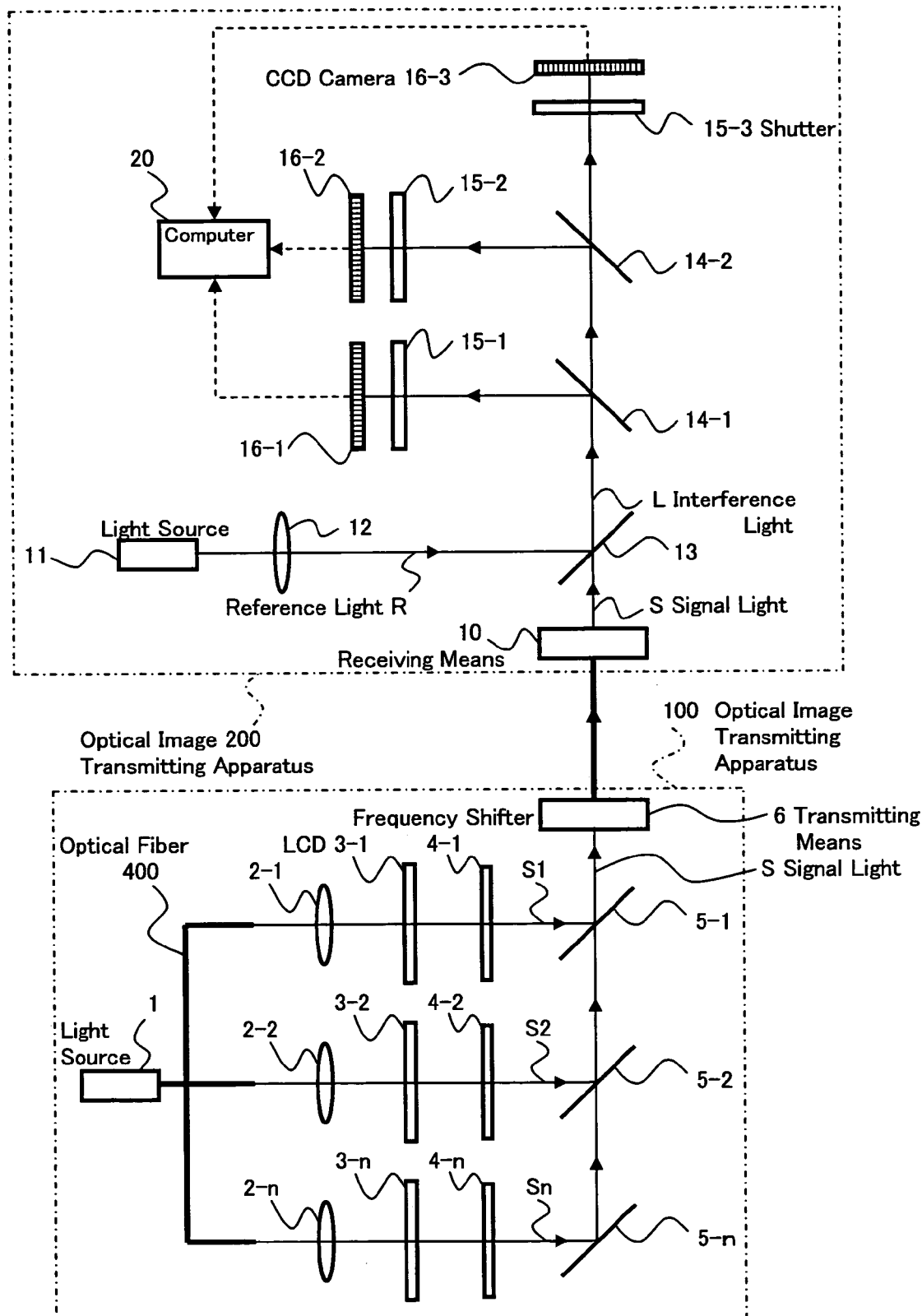
FIG. 6 is a schematic diagram showing an example of a structure of an optical image transmitting system according to a first modified example of the present invention.

FIG. 6 shows a schematic structure of a first modified example of the system. The optical image transmitting apparatus 100 of the optical image transmitting system of this modified example has almost the same structure as that of the above embodiment. The optical image transmitting apparatus 100 of the optical image transmitting system of this modified example includes a single light source (light source 1) in place of the plural light sources 1-1 to 1-n. The light beams emitted from the light source 1 enter one end of an optical fiber 400 constituting "light guide means" referred to in the present invention. The optical fiber 400 is branched at the other end into plural (n) fibers. The light beam from the light source 1 is divided into n optical paths to enter the lens systems 2-1 to 2-n, and is passed through the LCDs 3-1 to 3-n and the frequency shifters 4-1 to 4-n to produce the optical image information beams S1 to Sn. The optical image information beams S1 to Sn are superimposed by means of the beam splitters 5-1 to 5-(n-1) and the reflector 5-n to produce the signal light S, the signal light being emitted to the optical image receiving apparatus 200 by the transmitting means 6. The optical image receiving apparatus 200 selectively detects the optical image information beams S1 to Sn through the same processing as in the above embodiment.

According to the first modified example, a single light source suffices for generation of the plural optical image information beams S1 to Sn, resulting in the power-saving optical image transmitting apparatus 100.

Note that for achieving the beneficial effects of the first modified example, the light sources fewer than the produced optical image information beams need only to be provided to the optical image transmitting apparatus 100. For example, in order to produce five optical image information beams, two light sources may be arranged, and the optical path for the light beam from the first light source may be divided into two for producing first and second optical image information beams. In addition, the optical path for the light beam from the second light source may be divided into three for producing third to fifth optical image information beams.

Second Modified Example

Figure 7:
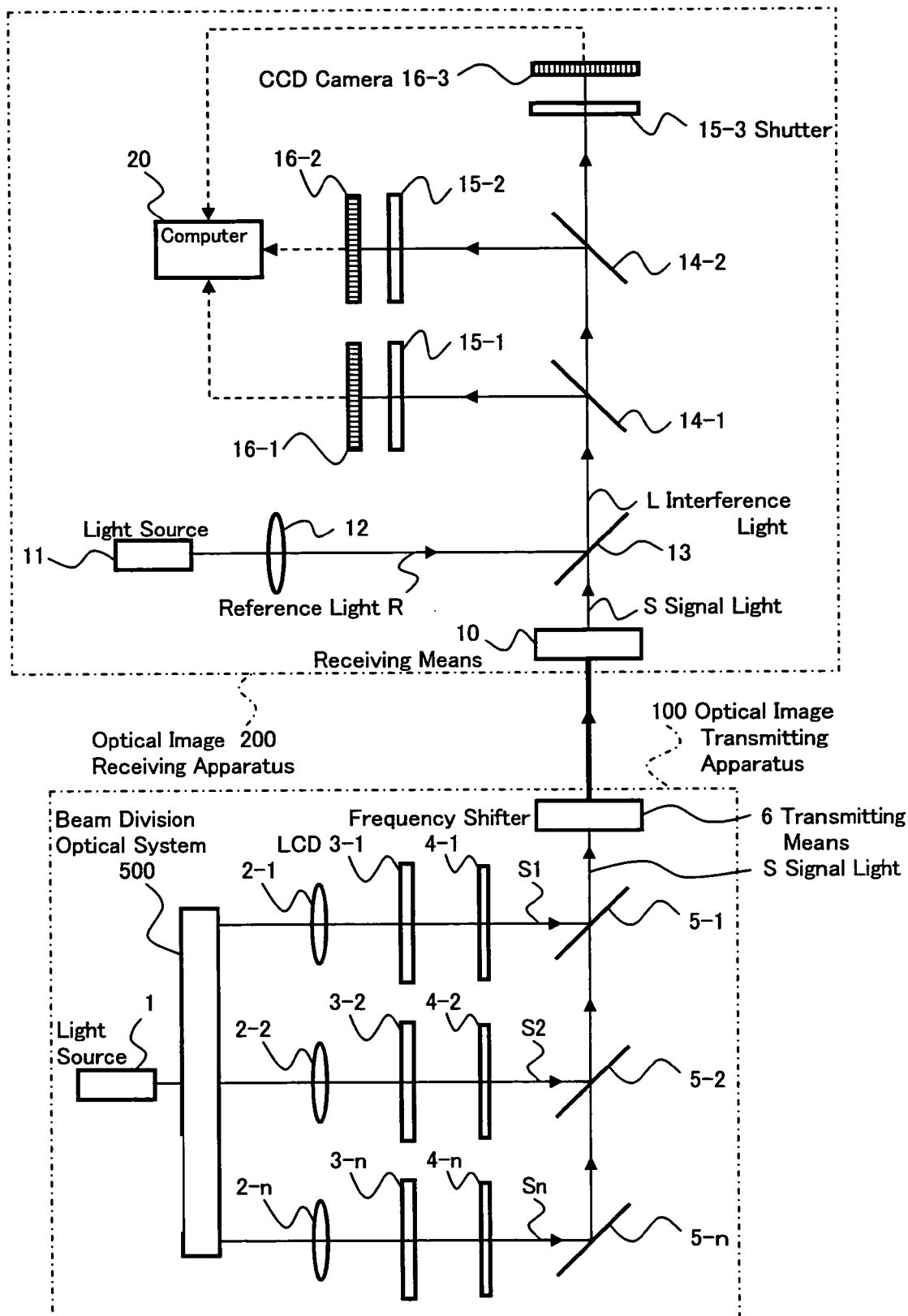
FIG. 7 is a schematic diagram showing an example of a structure of an optical image transmitting system according to a second modified example of the present invention.

FIG. 7 shows a schematic structure of a second modified example of the system. The optical image transmitting system shown in FIG. 7 has almost the same structure as that of the above embodiment shown in FIG. 1. The optical image transmitting apparatus 100 of the optical image transmitting system of this modified example has a single light source (light source 1) similar to the first modified example. The light beams emitted from the light source 1 enter a beam division optical system 500 constituting "light guide means" referred to in the present invention. The beam division optical system 500 includes an optical division member such as abeam splitter for dividing the optical path for the light beam from the light source 1, and a reflecting member such as a reflector for reflecting the light beam, and functions to divide the light beam from the light source 1 into plural (n) beams and allow the beams to enter the lens systems 2-1 to 2-n. The light beams incident on the lens systems 2-1 to 2-n are passed through the LCDs 3-1 to 3-n and the frequency shifters 4-1 to 4-n to produce the optical image information beams S1 to Sn. The optical image information beams S1 to Sn are superimposed by means of the beam splitters 5-1 to 5-(n-1) and the reflector 5-n to produce the signal light S, the signal light being emitted to the optical image receiving apparatus 200 by the transmitting means 6. The optical image receiving apparatus 200 selectively detects the optical image information beams S1 to Sn through the same processing as in the above embodiment.

According to the aforementioned second modified example, similar to the first modified example, a single light source suffices for generation of the plural optical image information beams S1 to Sn, resulting in the power-saving optical image transmitting apparatus 100. Also, similar to the first modified example, the light sources fewer than the produced optical image information beams need only to be provided to the optical image transmitting apparatus 100.

Third Modified Example

Figure 8:
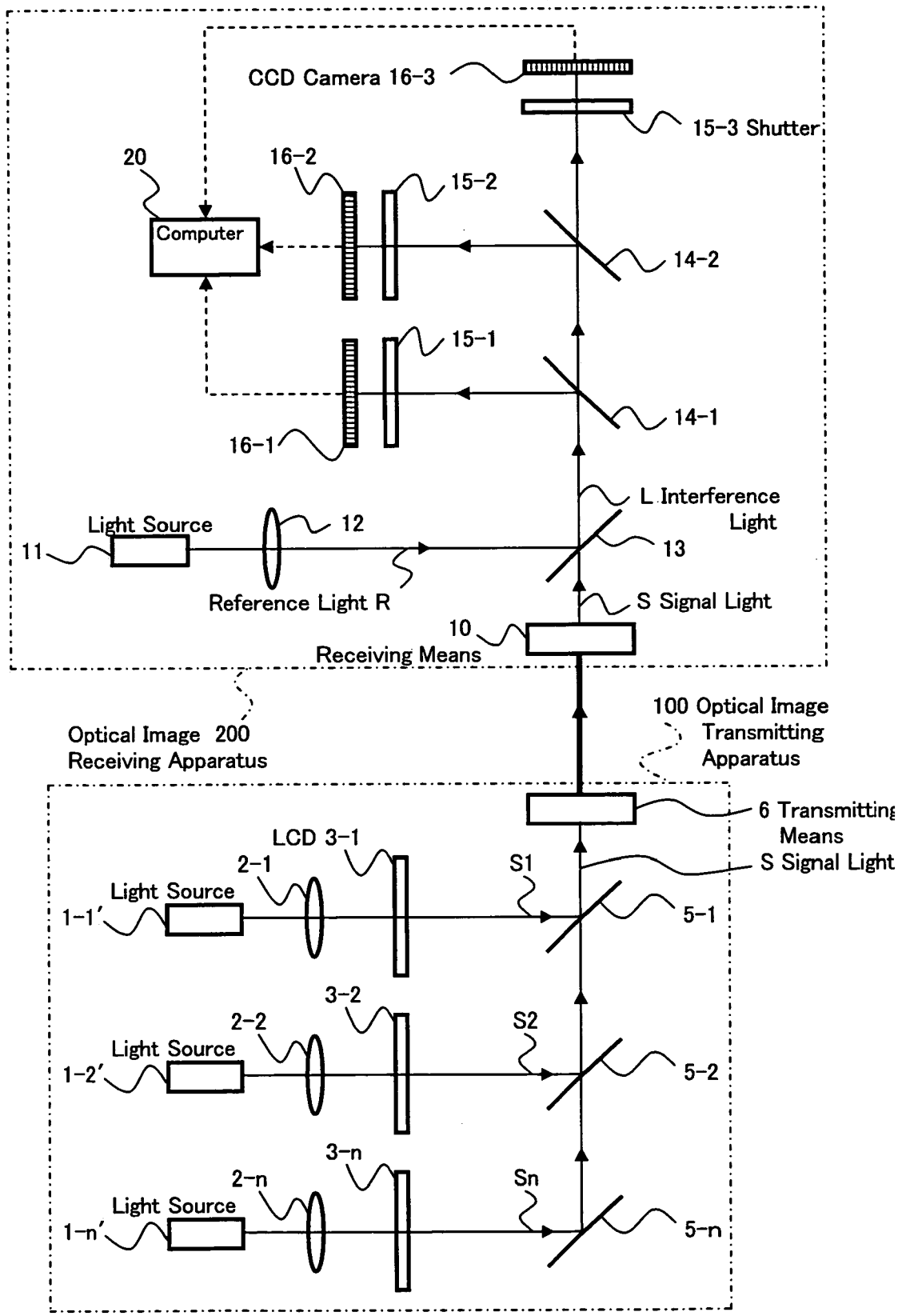
FIG. 8 is a schematic diagram showing an example of a structure of an optical image transmitting system according to a third modified example of the present invention.

FIG. 8 shows a schematic structure of a third modified example of the system. The optical image transmitting system shown in FIG. 8 has almost the same structure as that of the above embodiment shown in FIG. 1. The optical image transmitting apparatus 100 of the optical image transmitting system of this modified example has as many light sources 1-1' to 1-n' as the produced optical image information beams S1 to Sn, but dispenses with the frequency shifters 4-1 to 4-n shown in FIG. 1. The light sources 1-1' to 1-n' emit the light beams of different frequencies. Thus, the plural optical image information beams S1 to Sn having different frequencies can be produced without the frequency shifters 4-1 to 4-n. Note that in the case of applying the structure of the modified example, the light source 11 of the optical image receiving apparatus 200 is designed so as to change the frequency of the reference light R to be emitted. As a result, it is possible to emit from the light source 11 the reference light R having almost the same frequency as that of the optical image information beam to be extracted, and produce the desired interference light L. The detection of the optical image information beams S1 to Sn with the optical image receiving apparatus 200 is the same as in the above embodiment.

According to this modified example, the frequency shifters 4-1 to 4-n can be omitted, which realizes a simple structure of the optical image transmitting apparatus 100.

Fourth Modified Example

Figure 9:
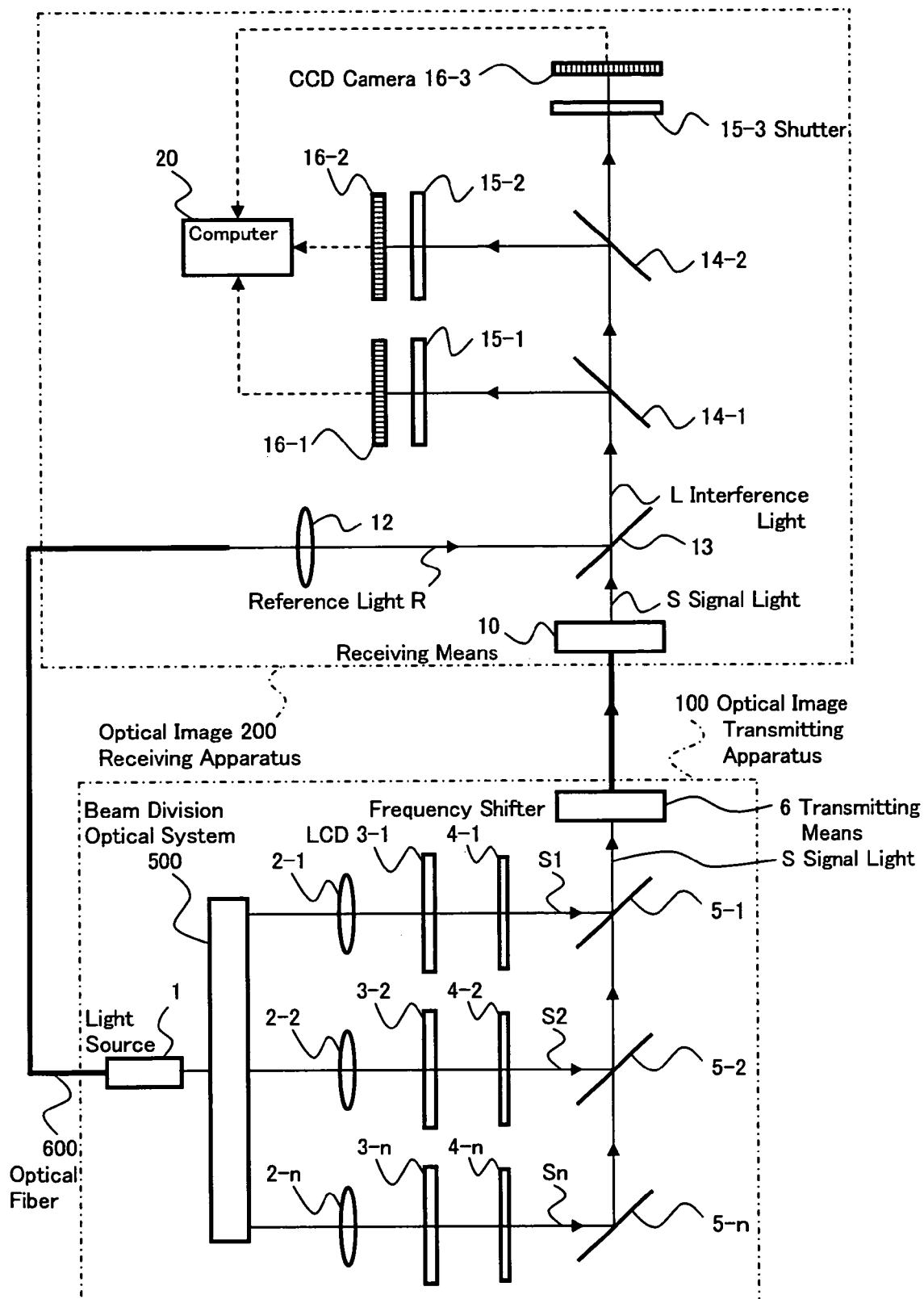
FIG. 9 is a schematic diagram showing an example of a structure of an optical image transmitting system according to a fourth modified example of the present invention.

FIG. 9 shows a schematic structure of a fourth modified example of the system. The optical image transmitting system shown in FIG. 9 has almost the same structure as that of the above embodiment shown in FIG. 1. The optical image receiving apparatus 200 of the optical image transmitting system of this modified example has no light source for emitting the reference light R. Instead, an optical fiber 600 extends from the optical source 1 of the optical image transmitting apparatus 100. The optical fiber 600 constitutes "light beam guiding means" referred to in the present invention, and functions to guide the light beam emitted from the light source 1 to the optical image receiving apparatus 200 so that the light beam is to be used as the reference light R.

Note that the light beam for producing optical image information emitted from the light source 1 may be partially guided to the optical image receiving apparatus 200 through the optical fiber 600. Alternatively, it is possible to guide a light beam to be emitted from the light source 1 aside from the light beam for generating the optical image information. The former is applicable to the structure for directly emitting the produced signal light S to the optical image receiving apparatus 200 and extracting the optical image information in real time on the optical image receiving apparatus 200 side. Further, the latter is applicable to the structure where when a user of the optical image receiving apparatus 200 extracts the optical image information, the user sends a request to the optical image transmitting apparatus 100, and the optical image transmitting apparatus 100 operates the light source 1 in response to the request to emit the light beam used as the reference light R.

Other Modified Examples

In the above embodiment, each of the shutters 15-1, 15-2, and 15-3 such as the high-speed shutters is used as the intensity modulating means in the present invention. However, the intensity modulating means is not limited to this. For example, a spatial light modulator (SLM) whose transmittance for transmitting the interference light can be periodically changed is provided instead of such shutter means that completely cuts off the interference light. Therefore, the intensity of the interference light received by photo detector means such as the CCD can be modulated to sample the interference light. That is, the shutter means changes the intensity of the interference light received by the photo detector means between 0 and 100 (maximal intensity). A structure for periodically changing the intensity of the interference light between, for example, 10 and 80 can be applied as the intensity modulating means in the present invention.

In addition to the change of the modulated intensity of the interference light between the two values, it is possible to employ a method of periodically switching the intensity among not only two values but at least three values or a method of periodically and successively switching the intensity between two values based on a sampling mode or the like. An interval for intensity modulation may be determined in view of the sensitivity of the CCD, or the like. If the intensity of the interference light can be periodically modulated, any structure may be employed as the intensity modulating means in the present invention. It is also possible to integrally form the intensity modulating means and the photo detector means.

Beam splitters of any form can be used as each of the beam splitters 13, 14-1, and 14-2. When a cube type beam splitter is used, reflected light at the interface with the air is likely to enter the CCD cameras 16-1 to 16-3, so a plate or wedge type beam splitter is preferably used. In addition, considering influences of the reflected light on the signal light S, it is also preferable to use the plate or wedge type beam splitter for the beam splitters 5-1 to 5-(n-1).

The three separate CCD cameras 16-1 to 16-3 are provided in the optical image receiving apparatus 200. For example, a three-chip CCD camera (unit) such as 3-CCD type color CCD camera may be used and the intensity modulating means may be disposed in front of each of the CCD chips to construct an apparently single CCD camera. Therefore, it is possible to simplify an apparatus structure and save the inner space of the apparatus.

When a light receiving surface of a single CCD camera is divided into a plurality of regions and the intensity modulating means is disposed in front of each of the regions, it is also possible to detect the interference light using each of the regions of the CCD camera as a single CCD camera. At this time, single intensity modulating means composed of, for example, a liquid crystal SLM having a size enough to cover the plurality of regions of the CCD camera may be disposed and a region of the intensity modulating means corresponding to each of the regions of the CCD camera may be controlled to detect the interference light. According to such a structure, it is possible to simplify an apparatus structure and save the inner space of the apparatus. In addition, it is unnecessary to perform sampling with synchronous control of a plurality of CCD cameras. Therefore, a control system can be simplified.

Offset adjustment of a DC component of a charge stored in the CCD cameras 16-1 to 16-3 and gain adjustment of an AC signal may be suitably performed to improve the contrast of interference fringes produced by the detected interference light L.

In the optical image receiving apparatus 200, the phase difference $\Delta\theta_{1,2}$ between the sampling function $m_1(t)$ and the sampling function $m_2(t)$ is set to $-\pi/2$ and the phase difference $\Delta\theta_{1,3}$ between the sampling function $m_1(t)$ and the sampling function $m_3(t)$ is set to $\pi/2$. In this way, the interference light components are sampled. However, the present invention is not limited thereto.

In the optical image receiving apparatus 200, the interference light components are sampled at the sampling frequency (substantially) equal to the beat frequency. However, the present invention is not limited to such sampling. For example, when a frequency which is an integral multiple of the beat frequency of the interference light component as an extraction target is used as the sampling frequency, each of plural phase ranges of the interference light beam can be periodically sampled. According to such a method, the plural phase ranges can be sampled for each period of the interference light beam, so that the interference light can be analyzed more precisely. Therefore, it can be expected to improve the measurement precision.

It is also possible to apply a sampling frequency which is an integral submultiple (1/n) of the beat frequency. According to such a method, a predetermined phase range of the interference light beam is sampled every n-period. Therefore, this method can be efficiently used in the case where the intensity changed by the intensity modulating means cannot keep up with the beat frequency.

Note that the sampling frequency is controlled based on the setting information on the shift amount in which the frequency shifters 4-1 to 4-$n$ shift the frequencies, which is transmitted from the optical image transmitting apparatus 100 as mentioned above, but if a predetermined default value is used for the shift amount all the time, it is unnecessary for the optical image transmitting apparatus 100 to transmit the setting information, and the optical image receiving apparatus 200 may also effect sampling with the default value.

It is preferable that the sampling function used for the optical image receiving apparatus of the present invention have the duty of 50%. This is because when the duty is smaller than 50%, the quantities of light beams received by the CCD cameras 16-1 to 16-3 are decreased to reduce the detection efficiency of the interference light beam. On the other hand, even when the duty ratio exceeds 50%, the detection efficiency also reduces. Here, it is needless to mention that the sampling function having any duty but 50% can be used.

With respect to the sampling function used for the optical image receiving apparatus of the present invention, in order to suitably control the open/close timings of the shutters 15-1 to 15-3, it is preferable to use the rectangular waveform as shown in FIG. 3B. Note that a sampling function having a waveform other than the rectangular wave, such as a sine wave or a triangular wave can be used as appropriate.

The optical image receiving apparatus according to the present invention is not limited to the structure where the interference light is divided into three optical paths as in the above embodiment. The light may be divided into an arbitrary number of optical paths. In dividing the light into plural optical paths, preferably, photo detector means such as a CCD are provided on each optical path, and intensity modulating means are provided to all but one optical path or provided to all the optical paths. With the former structure, the intensity modulating means successively receive the interference light components traveling on the optical path not provided with the intensity modulating means, whereby DC components thereof can be measured. Note that, it is possible to employ, according to the detection method or calculation method for the interference light L, a structure where an arbitrary number of optical paths out of the plural divided optical paths are provided with the intensity modulating means as appropriate.

Further, as the photo detector means of the optical image receiving apparatus according to the present invention, in addition to the aforementioned CCD cameras 16-1 to 16-3, a line sensor including an integrated circuit can be used. A photo sensor having any structure such as a one-dimensional or two-dimensional one can be used as the photo detector means of the present invention insofar as the sensor has both a function of receiving the interference light and subjecting the light to photoelectric conversion and a function of accumulating charges based on the received interference light. Note that, when images involved in the transmission, that is, images displayed on the LCDs 3-1 to 3-$n$ are two-dimensional ones (generally two-dimensional images), a two-dimensional photo sensor is preferred as the photo detector means.

An optical fiber (bundle) used as a light guide member is provided in a part of the optical system of the optical image transmitting apparatus and/or the optical image receiving apparatus. Therefore, the degree of freedom of apparatus design can be improved, and the apparatus can be made compact.

The foregoing structure is given merely as an example of the embodiment of the present invention, and allows various modifications without departing from the gist of the present invention.

What is claimed is:

1. An optical image transmitting system, comprising:
   optical image transmitting means for producing a plurality of optical image information beams that represent a plurality of optical image information and include light beams having different frequencies, superimposing the plurality of optical image information beams into signal light, and emitting the signal light; and
   optical image receiving means for receiving the emitted signal light and selectively detecting the optical image information beams based on the frequency difference;
   wherein the optical image transmitting means includes:
   image producing means for producing the plurality of optical image information beams;
   frequency modulating means for modulating frequencies of the plurality of produced optical image information beams by different amounts;
   optical image information superimposing means for superimposing the plurality of optical image information beams whose frequencies are modulated to produce the signal light; and
   transmitting means for transmitting the produced signal light to the optical image receiving means;
   wherein the image producing means includes a plurality of display means for displaying an image and light sources for emitting a light beam to the displayed image; and
   the optical image information is created by using the image irradiated with the light beam from the light source.

2. An optical image transmitting system according to claim 1, wherein the light sources are provided to each of the plurality of display means.

3. An optical image transmitting system according to claim 1, wherein:
   the light sources fewer than the plurality of display means are provided; and
   the image producing means further includes light guide means for guiding the light beam from any one of the light sources to two or more of the display means.

4. An optical image transmitting system according to claim 3, wherein the light guide means is an optical fiber.

5. An optical image transmitting system according to claim 3, wherein the light guide means is an optical system including a light division member for dividing an optical path for the light beam from the light source.

6. An optical image transmitting system, comprising:
optical image transmitting means for producing a plurality of optical image information beams that represent a plurality of optical image information and include light beams having different frequencies, superimposing the plurality of optical image information beams into signal light, and emitting the signal light; and
optical image receiving means for receiving the emitted signal light and selectively detecting the optical image information beams based on the frequency difference;
wherein the optical image transmitting means includes:
a plurality of display means for displaying an image;
a plurality of light sources provided to each of the plurality of display means and adapted to emit light beams of different frequencies;
optical image information superimposing means for superimposing the plurality of optical image information beams created from the image irradiated with the light beam from the light source to produce the signal light; and
transmitting means for transmitting the produced signal light to the optical image receiving means.

7. An optical image transmitting system according to claim 6, wherein the display means is a liquid crystal display transmitting the light beam from the light source.

8. An optical image transmitting system according to claim 6, wherein the optical image information superimposing means is a beam splitter for superimposing the two optical image information beams incident from directions orthogonal to each other.

9. An optical image transmitting system, comprising:
optical image transmitting means for producing a plurality of optical image information beams that represent a plurality of optical image information and include light beams having different frequencies superimposing the plurality of optical image information beams into signal light, and emitting the signal light; and
optical image receiving means for receiving the emitted signal light and selectively detecting the optical image information beams based on the frequency difference;
wherein the optical image receiving means includes:
a reference light source for emitting reference light having a frequency different from all frequencies of the plurality of optical image information beams in the signal light;
reference light superimposing means for superimposing the signal light emitted from the optical image transmitting means on the reference light from the reference light source to produce interference light including a plurality of interference light components with a beat frequency corresponding to a frequency difference between the optical image information beams and the reference light; and
a detection system for selectively detecting the interference light components from the produced interference light;
wherein the optical image receiving means further includes image restoring means for restoring, based on the interference light component detected by the detection system, the image represented by the optical image information beam corresponding to the interference light component.

10. An optical image transmitting system according to claim 9, wherein the detection system includes:
intensity modulating means for periodically modulating an intensity of the produced interference light with a modulation frequency synchronous with a beat frequency of the respective interference light components; and
photo detector means for receiving the interference light whose intensity is modulated, converting the interference light into an electrical signal, and outputting the signal.

11. An optical image transmitting system according to claim 10, wherein the detection system further includes interference light dividing means for dividing the produced interference light into a plurality of optical paths; and
the intensity modulating means and the photo detector means are arranged on each of the plurality of divided optical paths for the interference light.

12. An optical image transmitting system according to claim 10, wherein the intensity modulating means is a shutter for periodically cutting off the interference light with the modulation frequency.

13. An optical image transmitting system according to claim 10, wherein the photo detector means is a CCD camera.

14. An optical image transmitting system, comprising:
optical image transmitting means for producing a plurality of optical image information beams that represent a plurality of optical image information and include light beams having different frequencies, superimposing the plurality of optical image information beams into signal light, and emitting the signal light; and
optical image receiving means for receiving the emitted signal light and selectively detecting the optical image information beams based on the frequency difference;
wherein the optical image transmitting means includes:
image producing means including a plurality of display means for displaying an image and a light source for emitting a light beam to the displayed image, and producing the plurality of optical image information beams; frequency modulating means for modulating frequencies of the plurality of produced optical image information beams by different amounts; optical image superimposing means for superimposing the plurality of optical image information beams whose frequencies are modulated to produce the signal light; and transmitting means for transmitting the produced signal light to the optical image receiving means;
the optical image transmitting system further comprises light beam guide means for guiding a light beam emitted from the light source of the optical image transmitting means to the optical image receiving means; and
the optical image receiving means includes: reference light superimposing means for superimposing the signal light from the optical image transmitting means on the light beam guided by the light beam guide means to produce interference light including a plurality of interference light components with a beat frequency corresponding to a frequency difference between the optical image information beams and the light beam; and a detection system for selectively detecting the interference light components from the produced interference light.

15. An optical image transmitting system according to claim 14, wherein the optical image transmitting means emits the signal light to the optical image receiving means through free space, or an optical waveguide including an image fiber capable of transmitting the optical image information.

16. An optical image transmitting apparatus, comprising:

image producing means for producing a plurality of optical image information beams that represent a plurality of optical image information and include light beams;

frequency modulating means for modulating frequencies of the plurality of produced optical image information beams by different amounts;

optical image information superimposing means for superimposing the plurality of optical image information beams whose frequencies are modulated to produce signal light; and transmitting means for transmitting the produced signal light to a predetermined optical image receiving apparatus for selectively detecting the optical image information beams based on the frequency difference, through free space or an optical waveguide including an optical fiber;

wherein the image producing means includes a plurality of display means for displaying an image, and a light source for emitting a light beam to the displayed image; and the optical image information is created from the image irradiated with the light beam from the light source.

17. An optical image transmitting method, comprising:

an optical image transmitting step of producing a plurality of optical image information beams representing a plurality of optical image information and including light beams of different frequencies, superimposing the plurality of optical image information beams to produce signal light, and emitting the produced signal light through free space or an optical waveguide including an image fiber capable of transmitting the optical image information; and an optical image receiving step of receiving the emitted signal light and selectively detecting the optical image information based on the frequency difference;

wherein the optical image transmitting setup includes:

image producing step for producing the plurality of optical image information beams;

frequency modulating step for modulating frequencies of the plurality of produced optical image information beams by different amounts;

optical image information superimposing step for superimposing the plurality of optical image information beams whose frequencies are modulated to produce the signal light; and transmitting step for transmitting the produced signal light to the optical image receiving step;

wherein the image producing step includes a plurality of display steps for displaying an image and light sources for emitting a light beam to the displayed image; and the optical image information is created by using the image irradiated with the light beam from the light source.

* * * * *